US010379876B2

(12) United States Patent
Chao et al.

(10) Patent No.: US 10,379,876 B2
(45) Date of Patent: Aug. 13, 2019

(54) MANAGING THE CUSTOMIZING OF APPLIANCES

(71) Applicant: International Business Machines Corporation, Armonk, NY (US)

(72) Inventors: Chih-Wen Chao, Taipei (TW); Gregory L. Galloway, Cumming, GA (US); Cheng-Ta Lee, Taipei (TW); Ming-Hsun Wu, Taipei (TW); Rick M. F. Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 14/941,864

(22) Filed: Nov. 16, 2015

(65) Prior Publication Data
US 2016/0147546 A1 May 26, 2016

(30) Foreign Application Priority Data
Nov. 20, 2014 (TW) .............................. 103140202 A

(51) Int. Cl.
*G06F 9/32* (2018.01)
*G06F 9/445* (2018.01)
(Continued)

(52) U.S. Cl.
CPC ............ *G06F 9/44505* (2013.01); *G06F 8/65* (2013.01); *G06F 9/4403* (2013.01); *G06F 21/57* (2013.01); *G06F 2221/2153* (2013.01)

(58) Field of Classification Search
CPC .... G06Q 30/0621; G06Q 20/40; G06Q 20/20; G06F 12/14; G06F 9/445; G06F 21/62;
(Continued)

(56) References Cited

U.S. PATENT DOCUMENTS 7,308,718 B1 * 12/2007 Brookner .............. G06F 21/305
726/29
7,802,092 B1 * 9/2010 Kelly .................... H04L 9/0861
713/155

(Continued)

FOREIGN PATENT DOCUMENTS

TW 201250592 A 12/2012
TW 201322130 A 6/2013
(Continued)

OTHER PUBLICATIONS

"Dell 12th Generation Server OEM Identity Module Adds Value for Customers through Customization," TBR White Paper, Technology Business Research Inc., Nov. 2011, 7 pages.

*Primary Examiner* — Mohammed Waliullah
(74) *Attorney, Agent, or Firm* — Yee & Associates, P.C.; Jeffrey LaBaw

(57) ABSTRACT

Disclosed is a method of customizing an appliance. The method includes steps of pre-storing a public key in the appliance; connecting the appliance to an external storage device; and booting up the appliance to automatically proceed with the following customization process: obtaining a customization file from the external storage device; authenticating the customization file with the public key; and executing customization with the customization file if the authentication succeeds.

16 Claims, 3 Drawing Sheets

(51) Int. Cl.
*G06F 8/65* (2018.01)
*G06F 9/4401* (2018.01)
*G06F 21/57* (2013.01)

(58) Field of Classification Search
CPC . G06F 9/44; G06F 29/30; H04L 12/14; H04L 12/1467
USPC .......................................................... 726/18
See application file for complete search history.

(56) References Cited

U.S. PATENT DOCUMENTS

| | | | |
|---|---|---|---|
| 8,544,016 B2 | 9/2013 | Friedman et al. | |
| 8,612,967 B1 | 12/2013 | Delker | |
| 8,645,717 B2* | 2/2014 | Flynn | G06F 9/4406 380/286 |
| 8,666,383 B1 | 3/2014 | Mauer et al. | |
| 8,667,464 B2 | 3/2014 | Crippa et al. | |
| 8,855,562 B2* | 10/2014 | Rajaraman | H04W 8/005 455/41.2 |
| 8,989,668 B2* | 3/2015 | Srivatsa | H04W 4/008 370/328 |
| 9,490,980 B2* | 11/2016 | Deshpande | H04L 9/0847 |
| 2002/0157010 A1* | 10/2002 | Dayan | G06F 21/80 713/191 |
| 2003/0221126 A1* | 11/2003 | Berman | H04L 63/0823 726/14 |
| 2004/0006700 A1* | 1/2004 | Freeman | G06F 21/57 713/189 |
| 2006/0143600 A1* | 6/2006 | Cottrell | G06F 21/572 717/168 |
| 2007/0006320 A1 | 1/2007 | Paul et al. | |
| 2007/0094603 A1* | 4/2007 | Yli-Urpo | G06F 8/38 715/741 |
| 2007/0277231 A1 | 11/2007 | Medvinsky et al. | |
| 2007/0288331 A1* | 12/2007 | Ebrom | D06F 33/02 705/27.1 |
| 2007/0298405 A1* | 12/2007 | Ebrom | G09B 25/00 434/365 |
| 2008/0052702 A1* | 2/2008 | Chuang | G06F 8/65 717/170 |
| 2008/0109243 A1* | 5/2008 | Ebrom | G06Q 30/0601 705/26.1 |
| 2009/0006970 A1* | 1/2009 | Jeffery | D06F 33/02 715/733 |
| 2010/0030982 A1 | 2/2010 | Sela et al. | |
| 2011/0025459 A1* | 2/2011 | Denison | G06Q 20/18 340/5.51 |
| 2011/0040960 A1 | 2/2011 | Deierling et al. | |
| 2011/0167362 A1 | 7/2011 | Nichols | |
| 2011/0238792 A1* | 9/2011 | Phillips | G06F 15/177 709/220 |
| 2011/0265078 A1 | 10/2011 | Beatty et al. | |
| 2013/0007428 A1 | 1/2013 | Khosrowpour et al. | |
| 2013/0031350 A1 | 1/2013 | Thielen et al. | |
| 2013/0291070 A1 | 10/2013 | Triantafillou et al. | |
| 2014/0156812 A1 | 6/2014 | Deng et al. | |
| 2014/0250291 A1* | 9/2014 | Adams | G06F 21/575 713/2 |
| 2016/0092199 A1* | 3/2016 | Peluso | G06F 8/65 717/171 |
| 2016/0134599 A1* | 5/2016 | Ross | H04L 63/08 713/168 |

FOREIGN PATENT DOCUMENTS

| | | |
|---|---|---|
| WO | WO2012078753 A1 | 6/2012 |
| WO | WO2013169983 A1 | 11/2013 |

\* cited by examiner

MANAGING THE CUSTOMIZING OF APPLIANCES

This application is based on and claims the benefit of priority from Taiwan Patent Application 103140202, filed on Nov. 20, 2014.

BACKGROUND OF THE INVENTION

Field of the Invention

The invention generally relates to a method of customizing an appliance, and more particularly, to allow entities other than appliance manufacturers to customize an appliance. The invention also relates to a method for management and restriction of the customization of an appliance.

Description of the Prior Art

The manufacture of information products such as computers and appliances has largely adopted OEM/ODM business models. Under OEM/ODM business models, the manufacturer and the vendor (brand owner) are different entities. When the OEM/ODM manufacturer finishes manufacturing the product, the product generally has to be customized for the vendor, such as adding brand identifications of the vendor on the exterior of the product or the user interface. In addition, customization further includes modifying, adding, or even removing specific functions or devices of the product according to requirements of the vendor.

It is evident that such customization processes are not only time-consuming but also costly. For many small-entity vendors, the amount of products ordered from the OEM/ODM manufacturer is small, and such small-entity vendors have to pay higher costs for customization due to the lack of economic scale. Therefore, although the OEM/ODM business models are very common, they still cannot be adopted by small-entity vendors.

For the details of such technical issues and the solutions in prior art, US Pub. 2011/0265078, US Pub. US 2013/0007428, and US Pub. 2014/0156812 may be referred to.

SUMMARY OF THE INVENTION

In one aspect, the present invention provides a method of customizing an appliance, and more particularly, to allow entities (such as vendors) other than appliance manufacturers to customize an appliance. The invention also relates to a method for management and restriction of the customization of an appliance.

It is firstly recognized by the present invention that, under OEM/ODM business models in prior art, customization processes of appliances are basically completed at the manufacturer end. As described above, this spends extra time and cost of the manufacturer, which are passed on to the vendors and subsequent end-consumers. Therefore, by the method provided in the present invention, customization may be completed by vendors instead of being limited to manufacturers, which may be particularly beneficial to, for instance, small-entity vendors, but the invention is not limited thereto.

In another aspect, it is also recognized that, in prior art, since customization processes rely on the manufacturer for completion, all the customization information is thus required to be provided to the manufacturer beforehand; in other words, it is possible for the manufacturer to be aware of all the details of the customization. However, under certain circumstances, customization may involve trade secrets of the vendor which the vendor does not wish to be known by the manufacturer. In such an aspect, the method of completing customization by the vendor provided in the present invention is particularly beneficial.

In addition, as the customization process no longer relies on the manufacturer, the present invention also provides a simple and convenient method of customization, so that customization may be done by oneself without engineering resources of the manufacturer. For example, by the present invention, an engineer of the vendor may use a portable storage device (such as a portable and low-cost USB flash drive) that stores the customization information file. The engineer only has to connect the appliance with the portable storage device, and after the appliance is booted, it may automatically access the customization file in the portable storage device for customization, and involvement of the engineer is not required. Therefore, the present invention is particularly advantageous for appliances without user interface devices such as displays, keyboards, mice, etc., but the invention is not limited thereto.

In addition to the method of completing customization by the vendor, the present invention also provides for management and restriction of the customization by the manufacturer that still has to prevent, for instance, but not limited to, arbitrary modifications to the product by unauthorized third parties. In one embodiment, the manufacturer pre-stores a public key in the appliance before customization, and the authorized vendor is required to prepare the customization file by a predetermined method and produce a digital signature for the customization file with a corresponding private key, so that the appliance is authenticated with the pre-stored public key and the contents are accessed, and thus possibilities of modification of the product by unauthorized third parties are eliminated. In addition, in another embodiment, a customization lock file is also provided as a mechanism to prevent the customized appliance from being customized again (such as by other vendors).

In one embodiment, a method of customizing an appliance is disclosed, which includes:
  pre-storing a public key in the appliance;
  connecting the appliance to an external storage device; and
  booting up the appliance to automatically proceed with the following customization process:
    obtaining a customization file from the external storage device;
    authenticating the customization file with the public key; and
    executing customization with the customization file.

In another embodiment, the present invention also provides an appliance implementing the method described above.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The following description, the appended claims, and the embodiments of the present invention further illustrate the features and advantages of the present invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE EMBODIMENTS

Figure 1:
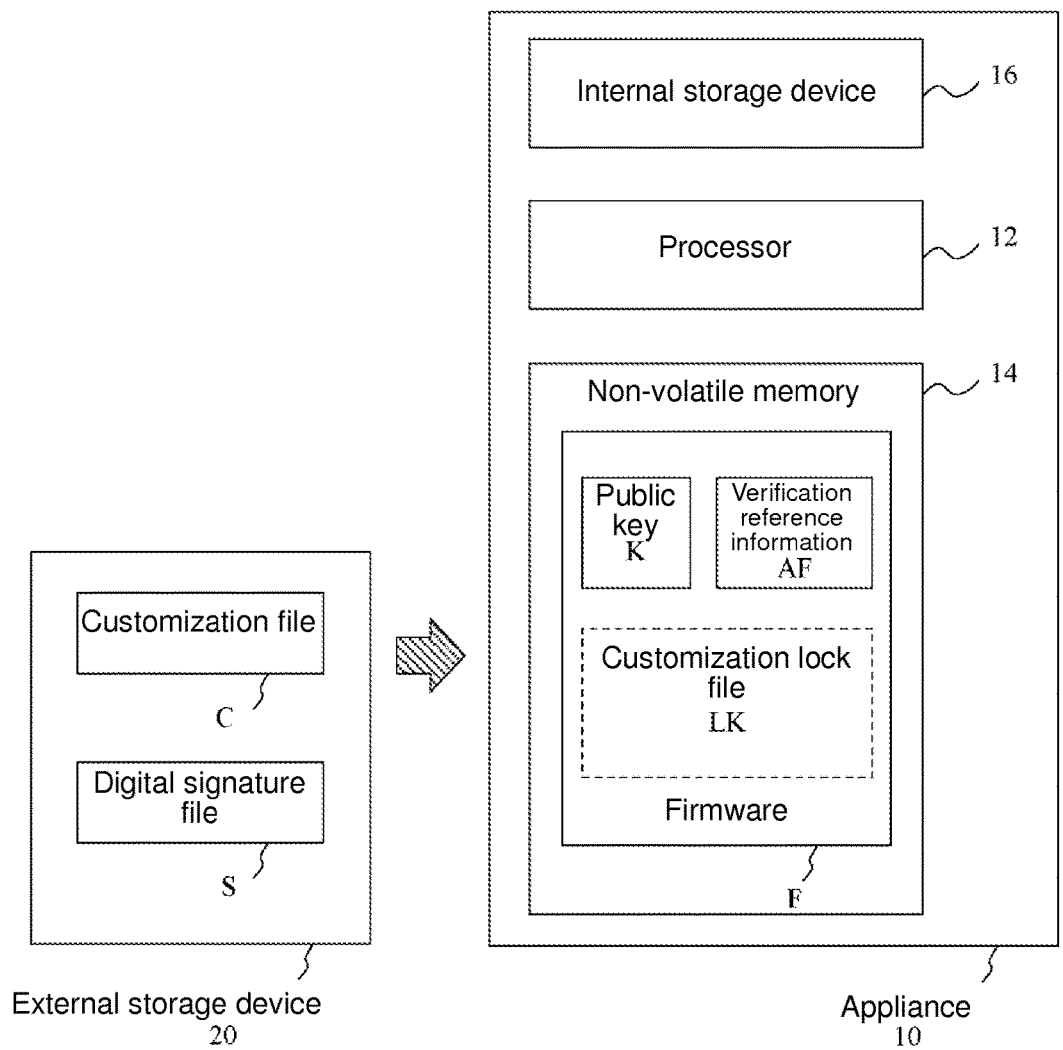
FIG. 1 is an appliance of an embodiment of the invention.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment", and similar language throughout this specification may, but do not necessarily, all refer to the same embodiment.

As will be appreciated by one skilled in the art, the present invention may be embodied as a computer system/device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
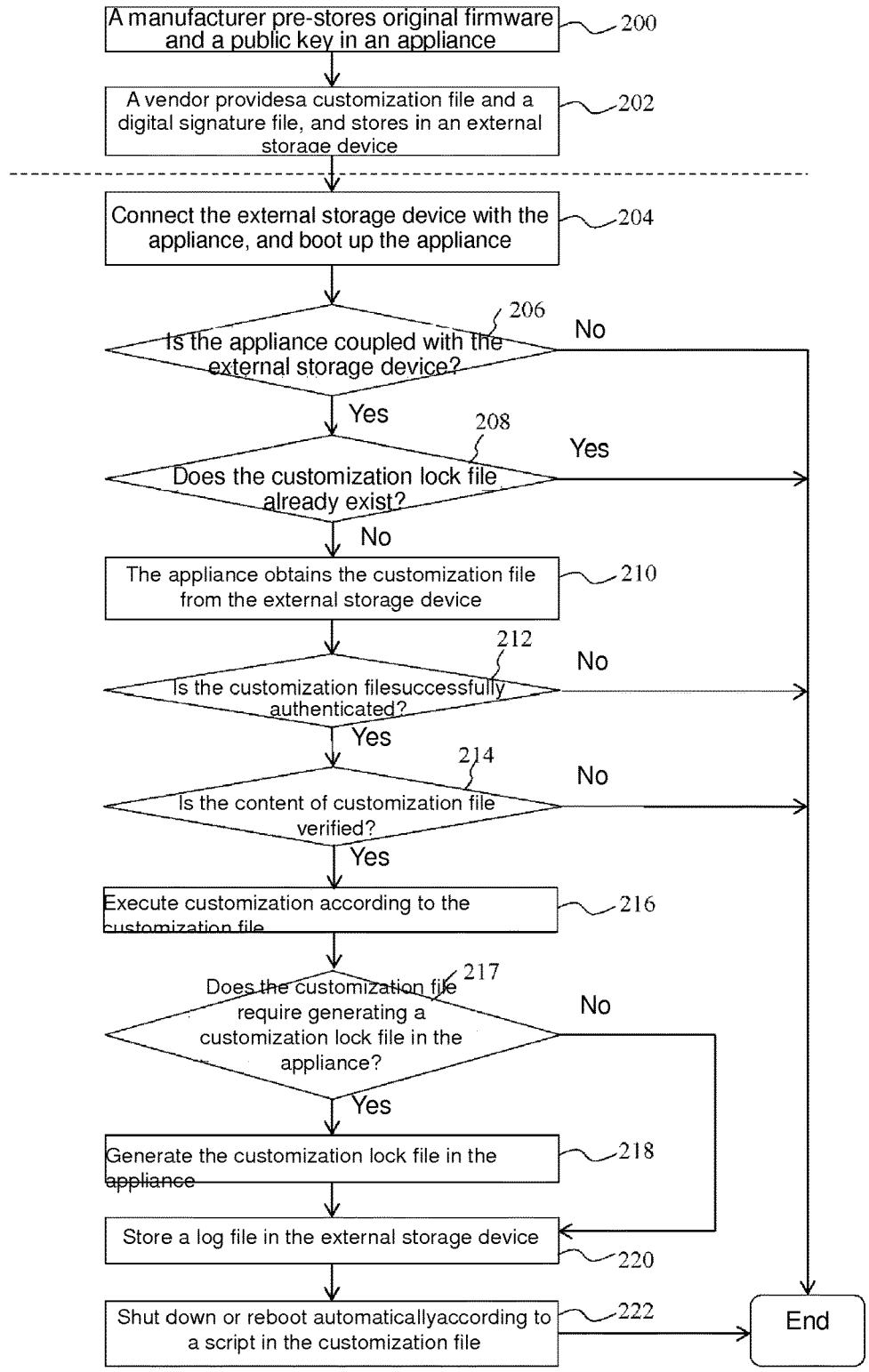
FIG. 2 is a flowchart of methods of embodiments of the invention.
Figure 3:
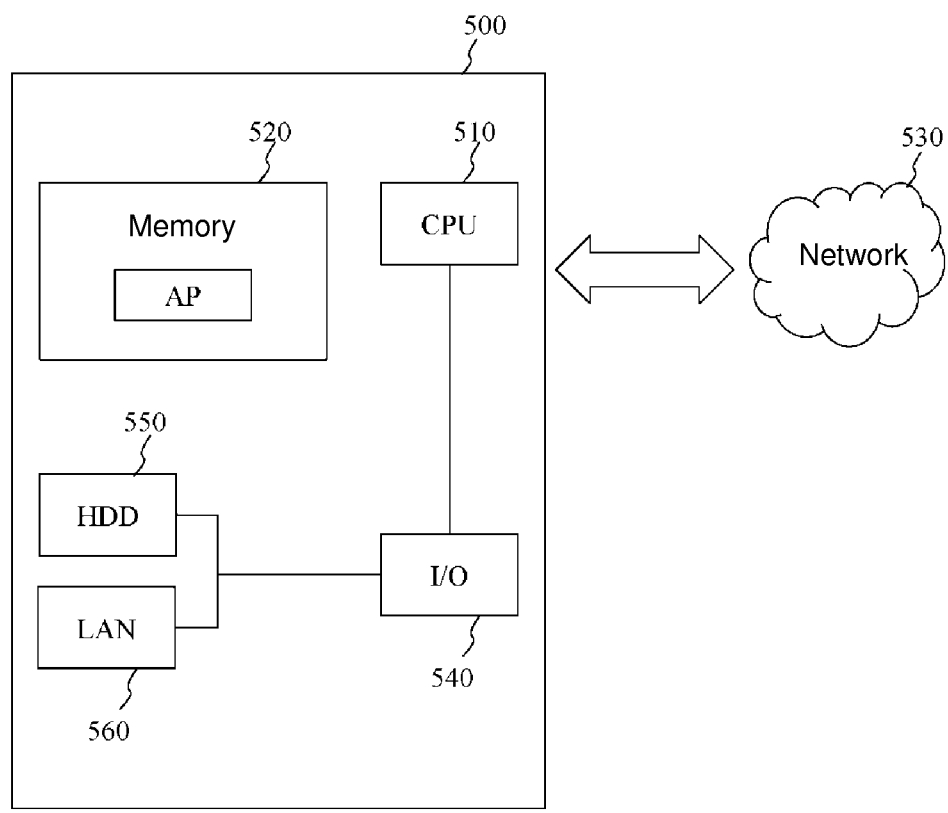
FIG. 3 is an appliance of an embodiment of the invention.

Referring now to FIG. 1 through FIG. 3, computer systems/devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

<System Architecture>

FIG. 1 shows an appliance 10 of an embodiment. In this embodiment, the appliance 10 is an intrusion prevention system (IPS), but the invention is not limited thereto. For example, the appliance 10 may also be implemented as a firewall, load-balance device, or other network appliance. In other embodiments, the appliance 10 may also be implemented as a personal appliance or server.

The appliance 10 implemented as an IPS includes analysis engine (not shown) such as SNORT or PAM analysis engine, which may determine intrusion, attack, or other events related to network security according to received packets. For details of the appliance 10 not directly related to the present invention, the product Network Security IPS of IBM Company may serve as reference, particularly the technical document "Network Intrusion Prevention System Installation Guide".

The appliance 10 includes a processor 12, a non-volatile memory 14 (such as EEPROM), and an internal storage device 16 (such as a flash storage device or hard disk).

After the manufacturer has completed manufacturing the appliance 10 but before delivering to the vendor (i.e., before customizing), the non-volatile memory 14 stores an original firmware F for the processor 12 to access to boot the appliance 10 and load an operating system (such as Linux) from the storage device 16. Preferably, the original firmware F is sufficient to boot the appliance 10 and execute basic functions. Simply from a technical point of view, even if the appliance 10 has not been customized yet, the appliance 10 at this stage is already capable of operating properly and serving functions.

The original firmware F is pre-installed in the appliance 10 by the manufacturer according to the Preboot Execution Environment (PXE) specification, i.e., pre-stored in the non-volatile memory 14, but the invention is not limited thereto; it may also be installed in the appliance 10 by the manufacturer according to other methods.

More particularly, the original firmware F includes a public key K for authenticating a customization file C signed with a digital signature by an authorized vendor. In one embodiment, the public key K may be a public key of an asymmetric encryption key pair for authenticating a document or a file signed with a corresponding private key by the authorized vendor; however, for such a practice, public keys K corresponding to private keys of different vendors are required to be pre-stored, which may slightly increase the time and cost spent by the manufacturer.

To further reduce the time and cost spent by the manufacturer, in another embodiment, the threshold cryptosystem may be adopted, where n of the threshold value is set as 1; therefore, only a single public key K is required to correspond to private keys of different vendors. In addition, in still another embodiment, the public key K may also be independent of the original firmware F; besides storing the public key K in the non-volatile memory 14, it may also be stored at a pre-assigned address (such as in a specific folder) of the internal storage device 16, and authorization management methods may be utilized to prevent the public key K from being improperly modified or deleted (such as setting the folder storing the public key K as read-only).

<Method Flow>

The embodiments of the present invention shall be described with reference to the flow in FIG. 2 in accordance with the devices shown in FIG. 1, where Steps 200 and 202 are preliminary steps, i.e., the appliance 10 at such steps may not have been delivered from the manufacturer to the vendor yet. Steps 204-222 are implemented by the vendor. Preferably but not necessarily, the appliance 10 has a small display device or indicator device (not shown) for the vendor engineer to be aware of the present step and status of the appliance 10.

Step 200: before the manufacturer delivers the appliance 10, the original firmware F including the public key K is installed in the appliance 10. It is understood that, in other embodiments, the public key K may be independent of the original firmware F. The manufacturer subsequently delivers the appliance 10 to the vendor, and the vendor performs customization. In the meantime, the vendor produces the customization file C beforehand according to a format provided by the manufacturer, which may include logo of the vendor, icons, graphical user interface themes, and profiles (including setting values of network environment settings and other settings). In addition, if the manufacturer permits, the customization file C may even include plug-ins produced by the vendor. Alternatively, if the manufacturer discovers defects in the original firmware F that require corrections or updates after the appliance 10 is delivered, the manufacturer may provide an updated version of the original firmware F to the vendor. Even though the update of the original firmware F is mainly for the purpose of solving common defects and not for customizing for certain vendors, the vendor may add the updated version of the original firmware F to the customization file C and update the original firmware F by the following customization steps.

Step 202: the vendor stores the customization file C in an external storage device 20 (such as, but not limited to, a portable USB flash drive). To confirm that the vendor is authorized by the manufacturer, the customization file C is signed with a private key (not shown) corresponding to the public key K, and thus the external storage device 20 has to be stored with an encrypted digital signature file S produced after signing the customization file C with the private key.

Step 204: connect the external storage device 20 with the appliance 10, and boot up the appliance 10 with the original firmware F. The appliance 10 is coupled with the external storage device 20 via corresponding interfaces (such as a USB connector; not shown).

Step 206: during the booting process, the processor 12 detects whether the appliance 10 is coupled with the external storage device 20 according to the design of the original firmware F. If yes, the flow proceeds to Step 208; if not, the flow ends.

Step 208: preferably, the processor 12 determines whether a predetermined customization lock file LK exists in the non-volatile memory 14 or the storage device 16 according to the design of the original firmware F. If yes, the appliance 10 cannot be further customized, i.e., it is locked, and the flow ends; if not, the flow proceeds to Step 210. The implementation of the customization lock file LK is not limited, as long as the processor 12 may access it during the booting process and determine whether to execute the customization process in the following Steps 210-222. The practices of general databases regulating program execution or data access by lock files may also be referred to. An exemplary Linux program code of this step is in below.

```
result = false
if file exist /etc/customization_done.lck then
    log "customization is done"
    exit
else
    result = do_ customization tasks( )
fi
```

Step 210: the processor 12 automatically obtains the customization file C from the external storage device 20 according to the design of the original firmware F.

Step 212: to confirm that the customization file C is from an authorized vendor, the processor 12 authenticates the customization file C by decrypting the digital signature file S with the public key K. If the authentication succeeds, the customization file C is indeed from an authorized vendor and the flow proceeds to Step 214. If the authentication fails, the customization file C is from a suspicious source and the flow ends.

Step 214: in this embodiment, the original firmware F includes a verification reference information AF, and the processor 12 verifies the validity of a content of the customization file C according to the verification reference information AF, such as verifying whether the format, version, and content of the customization file C are correct. For instance, if the customization file C includes the logo of the vendor, the verification reference information AF regulates the format and file size of the image file. If the customization file is successfully verified, the flow proceeds to Step 216; if not, the flow ends.

Step 216: the processor 12 accesses the customization file C, and copies related customization information of the customization file C to a suitable folder in the original firmware F or to other predetermined locations in the appliance 10 to the perform the customization process. As described above, the customization information may include logo of the vendor, icons, and graphical user interface themes which do not exist in the original firmware F, and thus by the customization process in this step, the appliance 10 may display logo of the vendor, icons, and graphical user interface themes according to the customization information. In addition, the processor 12 may adjust the settings (such as network settings) of the original firmware F according to the profiles in the customization file C. In another embodiment, a customized firmware image produced by the customization file C may be used to replace the original firmware F provided by the manufacturer, so that when an end user of the appliance 10 executes "default setting recovery" during operation, the firmware customized by the vendor instead of the original firmware F provided by the manufacturer is recovered.

Step 217: in this embodiment, after completing customization, the vendor is allowed to decide whether to generate the customization lock file LK according to a parameter in the customization file C to prevent the appliance 10 from being customized again. Such a feature allows the vendor to test multiple customizations to determine the optimal customization version and then place the customization lock file LK. In this step, if the parameter in the customization file C requires the processor 12 to generate the customization lock file LK, the flow proceeds to Step 218; if not, the flow proceeds to Step 220. As for the parameter in the customization file C, an exemplary Linux program code described below may be referred to. It should be mentioned that, in other embodiments, the manufacturer policies may restrict the vendor to execute customization only once, and such parameters are not provided for the use of the vendor; under such circumstances, Step 217 is omitted and the flow directly proceeds to Step 218.

```
if result == true and stop_future_ customization( ) == true then
    create /etc/customization _done.lck
fi
```

Step 218: in this step, the processor 12 generates the customization lock file LK in the non-volatile memory 14 or the storage device 16, so that the appliance 10 may not be subsequently customized again by the method shown in FIG. 2 (refer to Step 208 described above).

Step 220: optionally, the processor 12 may store a log file of the present customization in the external storage device 20.

Step 222: in an optional embodiment, the customization file C includes a script. In this step, the processor 12 performs designated operations according to the script after completing customization, such as shutting down or rebooting automatically after 10 minutes, or enabling or disabling a specific function (such as allowing the appliance 10 to only operate under specific modes or only use specific network protocols). However, it should be understood that the Step 222 is optional and is not necessary in the invention.

The customization processes (Steps 204-222) of the embodiments of FIG. 2 are performed by the vendor, and involvement of the manufacturer is not required, and thus the cost of the manufacturer is not increased and the manufacturer is prevented from being aware of the customization details. However, in other situations, especially when the amount of appliances 10 to be customized is large, manually coupling the external storage device 20 with the form of a portable USB storage device to the appliance 10 (refer to Step 204 of FIG. 2) obviously takes a lot of time. For such a situation, after acquiring permission by the vendor and the customization file C, the manufacturer may also extensively customize appliances 10 simultaneously according to the PXE specification; that is, a PXE server (not shown) of the manufacturer may serve as the external storage device 20 of FIG. 1, and provide the customization file C to the appliances 10 by conventional communication practices of PXE servers with appliances 10.

FIG. 3 further shows a hardware environment block diagram of a computer device 500, which may serve as the appliance 10 in FIG. 1.

In one embodiment, the computer device 500 has a processor to execute dedicated application programs; a storage device to save various information and program codes; a communication and input/output device to act as an interface for users to communicate with; and peripheral devices or other specific usage devices. In other embodiments, the present invention may also be implemented with other forms and have more or less apparatuses or devices.

As shown in FIG. 3, the computer device 500 may have a processor 510, a memory 520, and an input/output (I/O) unit 540. The I/O bus may be a high-speed serial bus such as a PCI-e bus, yet other bus architectures may also be used. Other connections to the I/O bus may be connected directly to the devices or through expansion cards. The I/O unit 540 may also be coupled to a hard disk 550 or a local area network (LAN) adaptor 560. By the LAN adaptor 560, the computer device 500 may communicate with other computer devices through a network 530. The network 530 may be implemented with any type of connection including static LAN connections or wide area network (WAN) connections or dialup networking by Internet service providers; the connection scheme is also not limited and may include wired or wireless connections such as communications with user computers by wireless networks of GSM or Wi-Fi. However, it should be understood that other hardware and software components (such as additional computer systems, routers, firewalls, etc.) may be included in the network despite not being shown in the figures. The memory 520 may be a random access memory (RAM), a read-only memory (ROM), or an erasable programmable read-only memory (EPROM or Flash memory). The memory 520 is used to save an operating system, program codes of a dedicated main program AP, and all kinds of information. The operating system is executed on the processor 510 and coordinates and provides control of various devices in the computer device 500; the processor 510 may access the memory 520 to execute the main program AP.

Those skilled in the art may understand that the hardware of the computer device 500 in FIG. 3 may have various modifications according to different embodiments. Other internal hardware or peripheral devices such as Flash ROM, equivalent non-volatile memory, optical drive, etc. may be added to or replace the hardware shown in FIG. 3.

The present invention can be embodied in any other specific manners without departing from the spirit or essential features of the present invention. Every aspect of the aforesaid embodiments of the present invention must be deemed illustrative rather than restrictive of the present invention. Hence, the scope of the present invention is defined by the appended claims instead of the above description. All equivalent meanings and scope which fall within the appended claims must be deemed falling within the scope of the appended claims.

What is claimed is:

1. A method of customizing an appliance, comprising steps of:
    pre-storing a public key and verification reference information in the appliance;
    connecting the appliance to an external storage device; and
    booting up the appliance to automatically proceed with the following customization process:
    obtaining a customization file from the external storage device;
    authenticating the customization file with the public key;
    verifying a content of the customization file according to the verification reference information; and
    responsive to a successful authentication of the customization file, executing customization with the customization file, wherein the appliance is customized according to the customization file after the content of the customization file is successfully verified, wherein the step of booting up the appliance to proceed with the customization process comprises: proceeding with the customization process after confirming that a customization lock file does not exist in a non-volatile storage device of the appliance.

2. The method as claimed in claim 1, wherein the step of booting up the appliance to proceed with the customization process comprises:
    booting up the appliance with a pre-stored firmware, and wherein the step of executing customization with the customization file further includes:
    modifying settings in the pre-stored firmware.

3. The method as claimed in claim 1, wherein the step of booting up the appliance to proceed with the customization process comprises:
    booting up the appliance with a pre-stored firmware, and wherein the step of executing customization with the customization file further includes:
    updating the pre-stored firmware.

4. The method as claimed in claim 1, wherein the step of executing customization with the customization file comprises:
    modifying a user interface of the appliance.

5. The method as claimed in claim 1, wherein the customization process further comprises:
    shutting down or rebooting automatically by the appliance according to a scheme designated in the customization file after completing customization.

6. The method as claimed in claim 1, wherein the customization process further comprises:
    enabling or disabling a specific function automatically by the appliance according to a scheme designated in the customization file after completing customization.

7. The method as claimed in claim 1, wherein the customization process further comprises:
    generating a customization lock file in a non-volatile storage device of the appliance after completing customization, wherein the customization lock file prevents another customization of the appliance from occurring.

8. The method according to claim 1, wherein the customization process further comprises:
    verifying validity of content of the customization file according to verification reference information.

9. The method according to claim 1, further comprising:
    producing a digital signature for the customization file with a private key corresponding to the public key.

10. The method according to claim 1, wherein the pre-stored public key is a non-encrypted public key of a manufacturer of the appliance, and the authenticating of the customization file is performed using the non-encrypted public key of the manufacturer of the appliance.

11. The method according to claim 10, wherein the pre-stored public key of the manufacturer of the appliance is stored in a firmware of the appliance.

12. The method according to claim 10, wherein the customization file is signed with a corresponding private key of the manufacturer of the appliance.

13. The method according to claim 1, wherein the external storage device further comprises a digital signature file.

14. A method of customizing an appliance, comprising steps of:
    connecting the appliance to an external storage device; and
    booting up the appliance to automatically proceed with the following customization process:
    determining whether a customization lock file exists in a non-volatile storage device of the appliance;

responsive to determining that the customization lock file does not exist, obtaining a customization file from the external storage device and executing customization according to the customization file;

determining whether to generate the customization lock file in the non-volatile storage device of the appliance according to a parameter in the customization file after completing customization; and generating the customization lock file in the non-volatile storage device if determination is positive.

15. An appliance, including:
a processor; and
a memory, including a set of computer-executable instructions,
wherein the processor executes the set of computer-executable instructions to implement steps of:
pre-storing a public key in the appliance;
connecting the appliance to an external storage device; and
booting up the appliance to automatically proceed with the following customization process:
reading a customization file from the external storage device;
authenticating the customization file with the public key; and
responsive to a successful authentication of the customization file, executing customization with the customization file, wherein the step of booting up the appliance to proceed with the customization process comprises:
proceeding with the customization process after confirming that a customization lock file does not exist in a non-volatile storage device of the appliance.

16. A computer program product comprising a non-transitory computer-readable medium having computer-usable program code embodied in the computer-readable medium that is configured to perform steps of:
pre-storing a public key in the appliance; and
booting up the appliance to automatically proceed with the following customization process:
determining if the appliance is connected to an external storage device;
responsive to determining that the appliance is connected to the external storage device, obtaining a customization file and an encrypted digital signature file from the external storage device;
authenticating the customization file by decrypting the encrypted digital signature file with the public key; and
responsive to a successful authentication of the customization file, executing customization with the customization file, wherein the step of booting up the appliance to proceed with the customization process comprises:
proceeding with the customization process after confirming that a customization lock file does not exist in a non-volatile storage device of the appliance.

* * * * *